Figure 3:
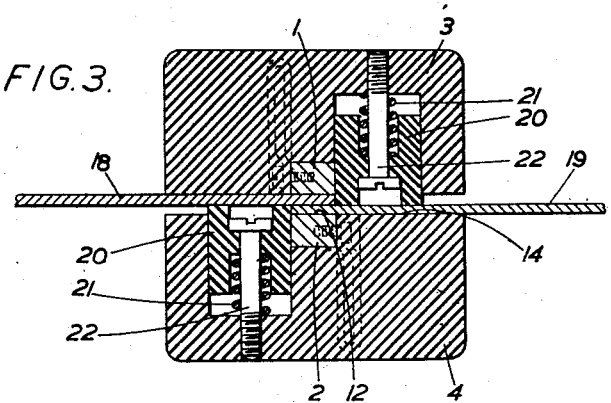

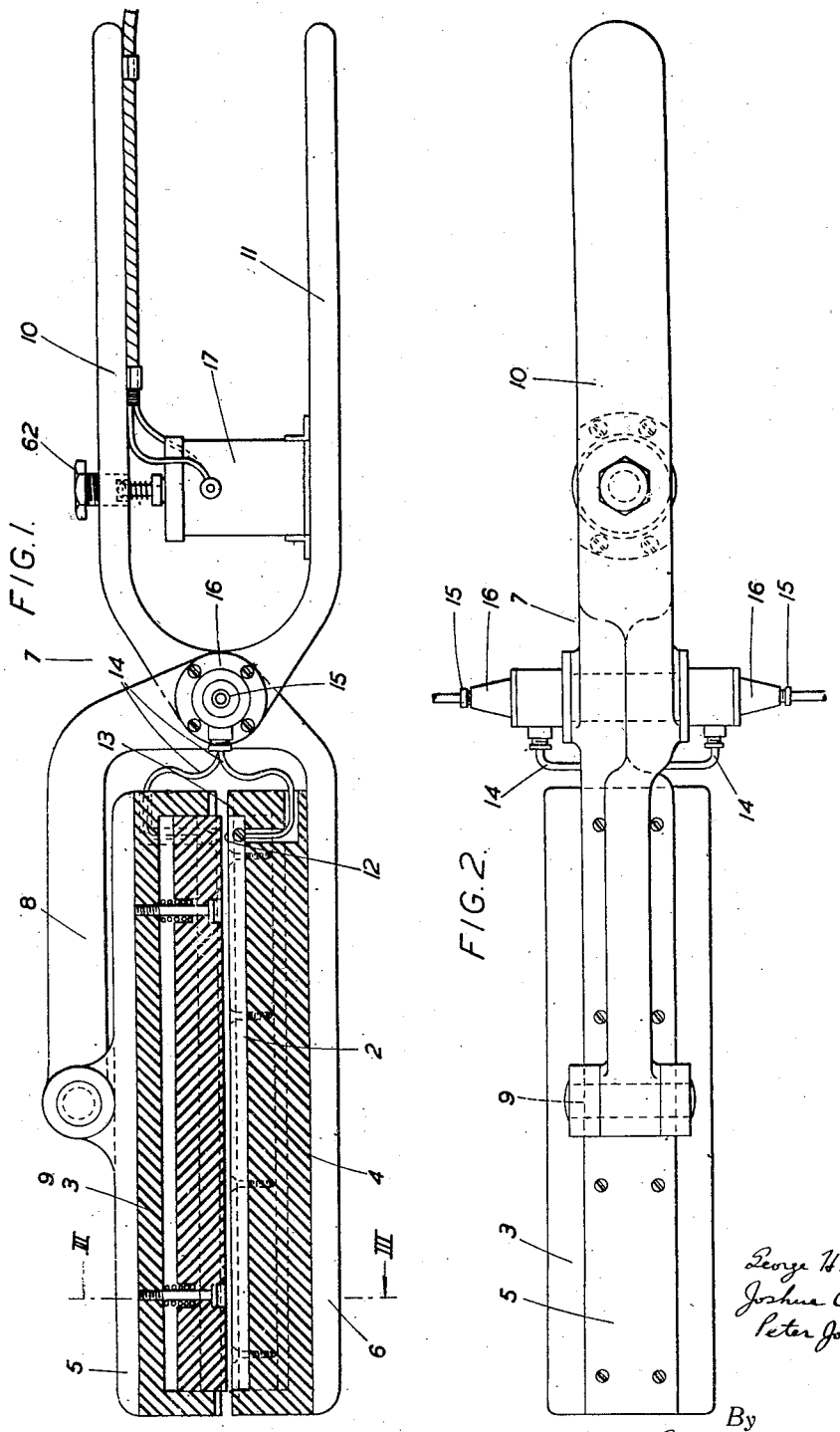

June 11, 1946.     G. H. WALTON ET AL     2,401,991
MACHINE FOR COMPRESSING AND HEATING ELECTRICALLY
THERMOPLASTIC MATERIALS
Filed Jan. 21, 1943     4 Sheets-Sheet 2

Inventors
Geo. H. Walton
Joshua C. Quayle
&
Peter Jones
By
Stebbins and Blenko
Attorneys June 11, 1946.  G. H. WALTON ET AL  2,401,991
MACHINE FOR COMPRESSING AND HEATING ELECTRICALLY
THERMOPLASTIC MATERIALS
Filed Jan. 21, 1943  4 Sheets-Sheet 3
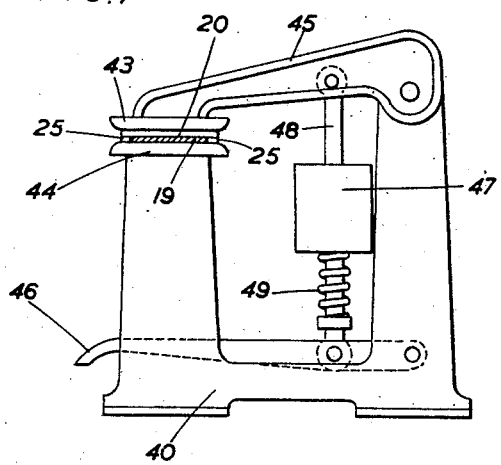
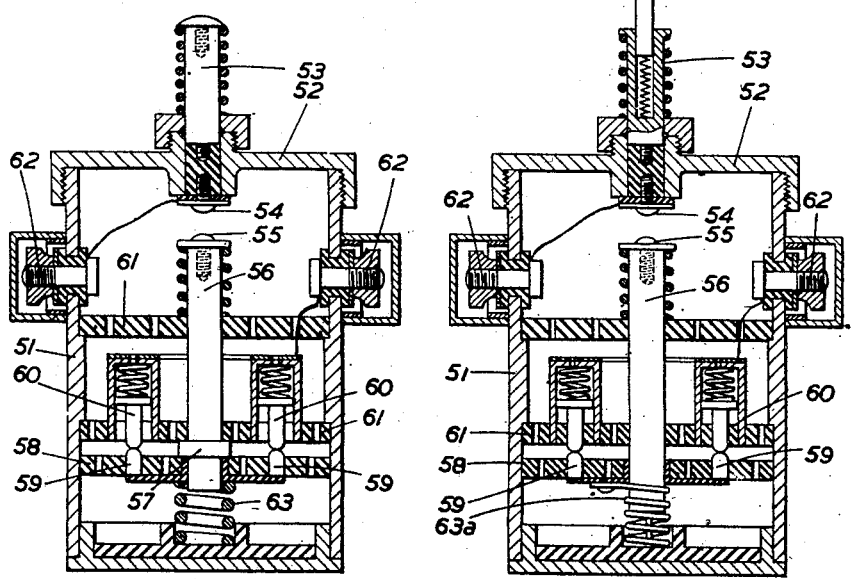

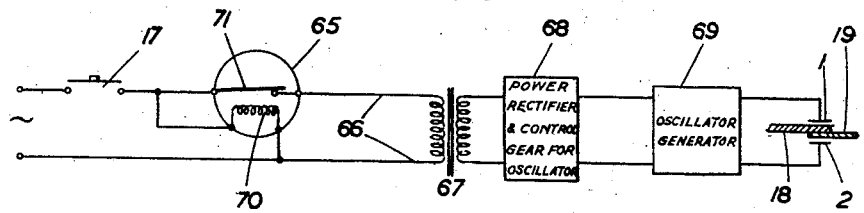
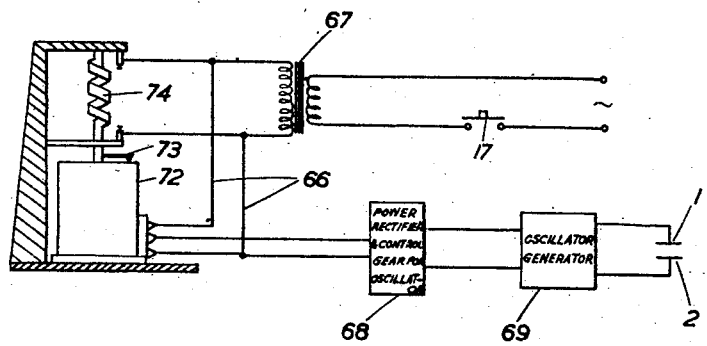
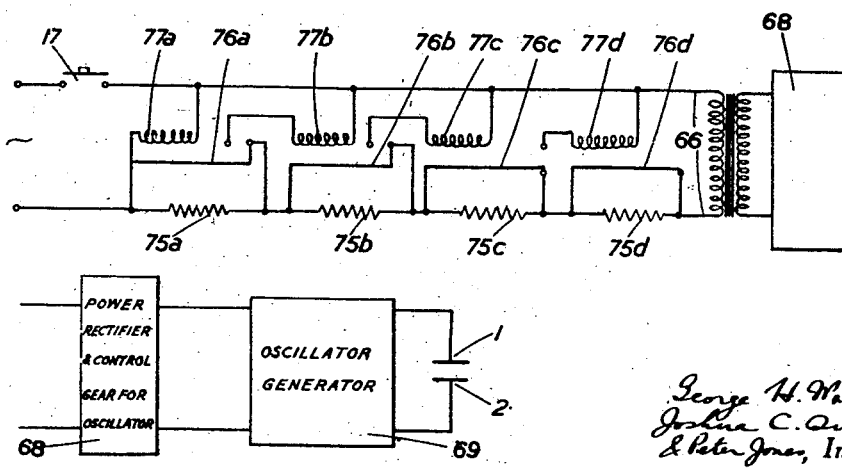

Patented June 11, 1946

2,401,991

UNITED STATES PATENT OFFICE 2,401,991

MACHINE FOR COMPRESSING AND HEATING ELECTRICALLY THERMOPLASTIC MATERIALS

George Hall Walton, Helsby, near Warrington, Joshua Creer Quayle, Helsby, and Peter Jones, Kelsall, near Chester, England, assignors to British Insulated Cables Limited, Prescot, Lancashire, England, a British company Application January 21, 1943, Serial No. 473,106
In Great Britain February 25, 1942

17 Claims. (Cl. 154—42)

This invention is concerned with the production of mouldings of electrically non-conducting thermoplastic material of a predetermined dimension in at least one direction, for instance, thickness. It is applicable to the joining of strips of such material and to the shaping of sheets or masses thereof. In accordance with our invention, the material of which the moulding is to be made, is placed between a pair of relatively movable moulding members, each of which comprises, that is to say, is formed by or fitted with, an electrode. Heat is generated in the material by the known method of subjecting it to the action of a high-frequency alternating or fluctuating field of electric force and whilst heat is so generated therein, pressure is exerted upon the relatively movable moulding members which are permitted to move towards one another until the moulding of heat-softened material attains the predetermined dimension.

When working with suitable material the heating may be effected rapidly so that the whole operation is short. It is then advantageous to arrange that the moulding apparatus provides some automaticity in its operation. For instance, means may be provided for co-ordinating the application of the electric field and the application of pressure to the thermoplastic insulating material. Such means may, for instance, ensure that pressure is applied to the material before the electric field is applied and, preferably, also that it is maintained until the field has been removed. The means for co-ordinating the period of application of the field and that of the applied pressure may in addition serve to vary automatically in a controlled manner the rate at which high frequency energy is applied to the material. Conveniently, the supply of high frequency energy to the electrodes is controlled by means actuated, in one or both directions, by the means for moving the moulding members.

In one form of arrangement the moulding members may be metallic and serve as the electrodes also. With this arrangement an insulating stop or some other controlling device is provided to limit the movement of the moulding members towards each other. This stop may also serve for trimming off the surplus material, if it is provided with a suitable shearing edge cooperating with a similar edge, which need not be of insulating material, carried by the moulding member opposite to that on which the insulating stop is mounted. This stop may, for instance, form a frame surrounding a mould composed of the metallic moulding members or a pair of confining walls for the sides of a strip of material passing or lying between moulding plates.

In another arrangement, the moulding members may be formed by metallic electrodes with insulating facings. In such a case allowance must be made for the effect of the production of heat in the facings by the high frequency electric field. The provision of insulating faces may be advantageous in the case where moulding of the external surface has to take place and in some cases may be essential to prevent short circuiting of the electrodes when the mould is closed. On the other hand, where the work to be done is primarily the welding or fusing together of two sheets or strips of material to form a homogeneous mass, it is preferable to have the metallic moulding members, which may exert a certain chilling effect on the outer surfaces of the thermoplastic material, so that this material becomes soft first at the inner surfaces which are to be joined together.

Figure 4:
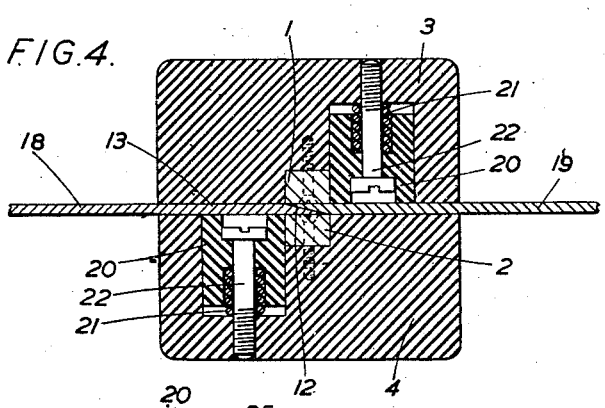
Figure 5:
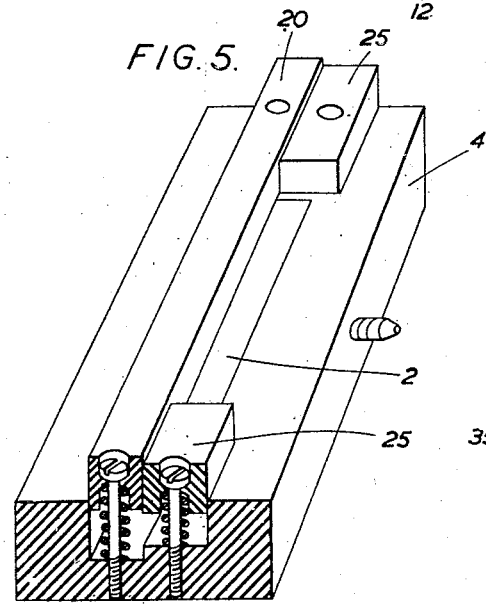
Figure 6:
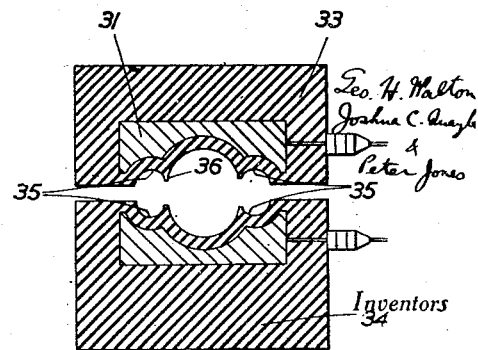

The invention will now be further described with the aid of the accompanying drawings, which show, by way of example, several forms of apparatus constructed in accordance with the invention. In these drawings, Figure 1 is a side elevation, partly in section, of a hand tool for jointing strips of thermoplastic insulating material by fusing or welding overlapping ends thereof, Figure 2 is a plan of the tool shown in Figure 1, Figure 3 is a cross-section, on an enlarged scale, taken on the line III—III of Figure 1, showing the relative position of the two jaws immediately before the jointing operation, Figure 4 is a corresponding view showing the relative position of the two jaws after the jointing operation, Figure 5 is a perspective view of a modified form of mould for jointing lengths of strip material, Figure 6 is a cross-section of a mould for moulding cylindrical bodies, Figure 7 is a diagrammatic view of a pedal controlled machine, Figure 8 is a sectional elevation of one form of the switch shown, somewhat diagrammatically, in Figure 1, Figure 9 is a corresponding view of a modified form of switch, Figure 10 is a diagram of an electrical circuit for supplying power to the tool shown in Figures 1–4 of the drawings, Figure 11 is a diagrammatic view of a device for varying the strength of the high frequency field during the application thereof, and Figure 12 is a circuit diagram of an alternative form of control device.

The tool shown in Figures 1, 2, 3 and 4 of the drawings has a pair of relatively movable moulding members comprising electrodes 1 and 2 housed each in one of a pair of housings 3 and 4 of insulating material. The housings themselves are secured to the inner faces of the jaws 5 and 6 of a single hand operable plier type mechanism 7. The upper jaw 5 is preferably secured to a jaw arm 8 of the plier mechanism by a central pivotal connection 9 so as to ensure an even distribution of pressure between the two moulding members when the insulated handles 10 and 11 of the mechanism are squeezed together. The electrodes, 1 and 2, are in the form of rods of approximately square cross-section housed in recesses in the faces 13 of the housings 3 and 4. Each recess extends longitudinally of the jaw and is of corresponding cross-sectional form to the electrode so that the exposed face 12 of the electrode lies flush with the face 13 of the housing. The two electrodes 1 and 2 are each coupled by a lead 14 to one of a pair of electrode terminals 15 supported by insulators 16 mounted one on each side of the central portion of the plier mechanism. Mounted on the lower handle 11 of the mechanism and actuated by relative movement of the upper handle 12 is a switch 17 serving to control the supply of high frequency energy to the electrodes.

The apparatus as thus far described provides two flat, insulated moulding members fitted with electrodes (1 and 2) between which can be placed, in super-position, the ends of two strips 18 and 19 of thermoplastic material which are to be joined together. It will be apparent that as the electrodes 1 and 2 are flush with the surfaces 13 of the housings, the length of overlap of the strips should coincide with the width of the electrodes as otherwise there is risk that the parts subject to the heating effect of high frequency currents passing between the electrodes will not be subjected to the necessary mechanical pressure, the pressure between the two housings being taken by the double thickness of material outside the influence of the electrodes. To facilitate this location of the strips, a second groove is provided in each housing of the same length as the electrode and having its adjacent wall flush with the adjacent side wall of the electrode. In this groove is a spring loaded stop 20 of insulating material, which is pressed away from the base of the groove by a pair of helical springs 21 to an extent limited by the heads of a pair of set-screws 22 screwed into the base wall of the groove. The stops 20 lie on one side of the electrodes 1 and 2 and one on the other side, and each serves correctly to align and longitudinally position the end of one of the two strips to be jointed, as is clearly shown in Figure 3. As the overlapping parts become softened, permitting the jaws to approach each other, the stops are pressed into the slots until their upper surfaces are flush with the surfaces 13 of the insulating members housing the electrodes. Inward movement of the electrodes towards each other is limited by the surfaces 13 of the housings outside the stops 20 coming into contact with the strip material. As these regions are remote from the electrodes, the strip is not subjected to direct heating and does not become softened. Consequently, it serves as a stop or gauge to control the thickness of the weld. Alternatively or in addition, stops of insulating material, which may or may not be adjustable to provide for welds of different thicknesses, may be formed on the ends of the housings 2 and 4 which extend beyond the ends of the electrodes and strip-locating stops 20. Such other stops may also serve to control the width of the weld in addition to its thickness, by making them of a breadth somewhat greater than the width of the electrodes and arranging for them to take into recesses of corresponding form in their own or the other housing as the housings move towards one another. In the former case they may, as shown diagrammatically in Figure 5, comprise a pair of spring pressed plungers 25 on each housing, with a limited inward travel. In both cases they may serve as lateral guides to facilitate correct alignment of each strip. In place of the spring loaded stops 25, fixed stops may be provided on one mould part which are of a depth which exceeds twice the thickness of the strip material to be joined between them and arranging that the other mould part slides down between them sufficiently to press out the material, lengthwise of the strip, to the original thickness before it is brought to rest.

In place of the strip jointing moulds described, other forms of mould may be fitted to the apparatus. Figure 6 is a diagrammatic cross-sectional view of a two part spherical or cylindrical mould. For reasons previously given, the electrodes 31 and 32 with which the moulding members are fitted are completely embedded in the insulating housings 33 and 34, respectively, and are shaped to provide an appropriate distribution, for instance a uniform distribution, of the field over the internal surface of the mould parts in order to ensure heating the various portions of the material to the desired extent. To accommodate any surplus plastic material forced out between the mould parts 33 and 34, the mould recess in each mould part is surrounded by a small channel 35 separated from the recess by a surface 36. As the moulding operation is completed, the superposed surfaces 36 meet and cut off excess material from the moulding.

The insulating material of which the stops and the housings supporting the electrodes are made should be one that is resistant to heat, and, where the electrodes are faced with insulating material, it will generally be preferable to employ a low-loss heat-resistant material for the facing, if not for the entire housing. Examples of suitable materials are steatite, low loss ebonite and a borate glass containing mica in solution and in suspension, such as the material at present sold under the trade name "Mycalex."

When the molding pressure required is greater than can conveniently be obtained by plier type apparatus, the housings supporting the electrodes may be mounted on the jaws of a hand, pedal or power operated press, of which an example is shown diagrammatically in Figure 7. This press comprises a U-shaped frame 40, on the upper end of one arm of which, called for convenience the front arm, is mounted an insulating housing 44 supporting the lower electrode. To the upper end of the rear arm of the frame is pivotally secured a swinging arm 45 which carries at its front end an insulating housing 43 supporting the upper electrode. These housings carry spring loaded end stops 20, one of which is seen, and spring loaded side stops 25 for positioning the strips, one of which is indicated at 19. Relative movement of the mould parts is effected by a pedal lever 46 coupled to the swinging arm 45 by a link 48. A spring 49 serves to separate the mould parts 43 and 44 when the pressure exerted by the pedal lever is released.

The supply of high frequency alternating electric current to the electrodes is preferably controlled automatically by a switch actuated by the means by which pressure is applied between the electrodes. In the apparatus shown in Figures 1 and 2 a switch 17 is mounted on one handle 11 of the plier mechanism and is actuated by relative movement of the other. In the apparatus shown in Figure 7, a switch, designated 47, is actuated by movement of the rod 48 coupling the swinging arm to the pedal lever. In both cases the switch is preferably inserted in a circuit supplying current at low (or zero) frequency to an oscillator generator or other frequency converter used to supply high frequency energy to the mould electrodes, or in a control circuit controlling such low frequency supply circuit. The switches 17 and 47 may be delay action switches or may have a simple "on-off" action and be used in association with a delay switch. Figures 8 and 9 show examples of switches of the former type. The switch shown in Figure 8 consists of an oil-filled tube 51 closed by a screw cap 52 through which passes a spring loaded plunger 53 operated by the compressive movement of the pliers 7, or by that of the press shown in Figure 7, to bring an insulated contact 54 on its lower end into engagement with a second contact 55 on the upper end of a second spring loaded plunger 56 carried in a pair of fixed insulating guides 61. The plunger 56 carries a collar 57 near its lower end, which end passes through a perforated check plate 58. The plunger 56 is caused to descend as the material in the mould becomes plastic and is squeezed by the applied pressure. As it descends, the collar 57 engages the perforated check plate 58, depressing it against the upward thrust exerted by a spring 63. The plate 58 carries a number of contacts 59 (two of which are shown), which initially engage a corresponding number of spring pressed contacts 60 on the lower perforated fixed guide plate 61. As will be seen from the drawings, the lower pairs of contacts 59, 60 are each in series with the upper pairs 54 and 55. As the moulding material is compressed and the check plate 59 descends, the spring loaded contacts 60 follow and maintain contact until compression of the material is almost complete, at which point the spring loaded contacts 60 are prevented from further travel and leave the contacts 59, thus interrupting the circuit between the switch terminals 62. On releasing the pressure and permitting the spring loaded plunger 56 to return, the check plate 58 moves upwards under the influence of the spring 63 but only slowly, due to the presence of viscous oil (not shown) in the cylinder. Consequently the upper switch contacts, 54 and 55 separate before the lower ones 59 and 60 again make contact. The point in the closing movement of the jaws at which the contacts 54 and 55 close may be adjusted by varying the setting of the screw 64 (Figure 1) which engages the plunger 53.

The switch shown in Figure 9 is very similar to that described with reference to Figure 8, but differs in that the check plate carrying the contacts 59 is attached to the lower end of the plunger 56 by a helical spring 63a which is extended as the plunger 56 is depressed, since movement of the plate 58 is delayed by the presence of the oil in the tube. This arrangement has the advantage that the speed at which contacts 59 and 60 break is independent of the rate of approach of the electrodes. When the pressure on the electrodes is removed, the plunger 56 quickly rises, but the rise of the check plate 58 under the influence of the spring 63a is delayed by the oil in the tube as in the previous form of construction.

It will be apparent that by incorporating in the improved apparatus a switch of the form shown in Figure 8 or 9, the switching off of the high frequency field is brought about by the continued squeezing movement of the plier apparatus, or continued movement of the rod coupling the pedal lever and swinging arm, as the thermoplastic material yields under the effect of heat and pressure. It is thus possible to deal satisfactorily with materials which require only a short time of heating, for instance, a heating time of 2 to 30 seconds. It is merely necessary to place the material between the moulding members and to squeeze the handles or depress the pedal, as the case may be. The compression, application of heating, removal of heating and the holding of the molding members while the material cools, follow in the correct sequence and time intervals.

Figure 10 illustrates an alternative control arrangement giving equivalent results. The switch 17 actuated by movement of the mould parts is a simple "on-off" switch. This is inserted in series with a thermal delay switch 65 in the low frequency circuit 66 supplying, through the transformer 67 and the rectifier and control gear 68, an oscillator generator 69. Closing of the switch 17 operated by movement of the tool lever closes the supply circuit 66 and simultaneously energises the heater 70 of the thermal delay switch 65, the element 71 of which automatically opens and breaks the circuit 66 after a predetermined period. The delay switch remains in the open condition until its heater has been de-energised by the opening of the tool-actuated switch 17.

The apparatus is suitable for any thermoplastic materials, of which plasticised polyvinyl chloride compositions may be mentioned by way of example. It will be understood that, for a given field, the rate of heating will be different with different materials. This will be taken care of to some extent by the semi-automatic control mentioned. It may, however, be taken care of also by the setting of the strength of the electric field adopted for any particular kind or thickness of material. As the electrical properties of the material to be moulded may change appreciably with temperature and the capacitance of the system change as the material is compressed, it may be advantageous to apply the high frequency energy at a controlled variable rate instead of merely switching it in at some fixed value. This may be effected by means of an arrangement, shown diagrammatically in Figure 11, in which the voltage of the supply to the frequency changing apparatus and its control gear 69 and 68 is adjusted by means of a rotary potentiometer 72, the position of the sliding contact 73 of which is regulated by an electrically heated bimetallic helix 74, the supply to the helix being controlled by the control switch 17 operated by movement of the mould parts. This arrangement may provide for a gradually increasing or gradually decreasing strength of high frequency field. An arrangement which provides for an increasing strength of field followed by a decreasing strength of field is shown diagrammatically in Figure 12. In this arrangement the output of the frequency converter is controlled by a group of impedances, 75a, 75b, 75c and 75d, in series with the supply circuit 66. Each impedance is controlled by a thermal delay switch (76a—76d). A number of these delay switches each serve to short circuit one of the impedances when actuated, the remainder when actuated have an opposite effect. On closing the control circuit switch 17 by a compressive movement of the tool carrying the mould parts, the frequency converter 69 and the heater 77a of delay switch 76a are energised. After a short delay, switch 76a operates and short circuits impedance 75a, thus increasing the input to the frequency converter 69, and energises the heater 77b of delay switch 76b which, after a short delay, operates and short circuits impedance 75b, thus further increasing the input to the converter, and energises the heater 77c of delay switch 76c. After a short delay this switch operates and energises the heater 77d of delay switch 76d and removes the short circuit across impedance 75c, thus reducing the input to the converter. Finally, delay switch 76d operates and further reduces the input. The duration of the complete cycle and of each phase thereof will naturally depend upon the nature of the moulding operation. The former may be of the order of from 2 to 30 seconds, for example.

In place of the arrangements shown in Figures 10 and 11, motor driven switches or cam actuated switches may be employed to control the rate of application of energy to the material to be moulded. For instance, the bimetallic helix 74 of Figure 11 could be replaced by an electric motor. Instead of controlling the rate of application of energy to the material by controlling the power supply to the oscillator or other frequency changing apparatus, as described with reference to and shown in Figures 11 and 12, it may be controlled by varying the reactance of the tuning or coupling circuit between the oscillator or other apparatus and the electrodes, for instance, by means of rotary variable condensers of which the capacity is varied by means similar to those used to vary the impedance in the arrangement shown in Figure 11 or in that shown in Figure 12.

The invention has been found to be particularly satisfactory for jointing strips of plasticised polyvinyl chloride compositions and for moulding such materials. Such materials can be heated rapidly and safely at frequencies of 20–30 megacycles per second, the heating time required to raise the material to temperatures, between 100° and 180° C., at which it can be molded being of the order of a few seconds only. The invention is, however, applicable to other materials and other operating conditions.

What we claim as our invention is:

1. Apparatus for jointing strips of thermoplastic insulating material by heating the overlapping ends thereof by subjecting them to a high frequency electric field and compressing them to weld them together, comprising a pair of relatively movable jaws, an insulating housing on each jaw, an electrode located in a central recess in each housing and having its face flush with that of the housing, a spring loaded stop located in a recess in each housing and extending along one edge of the electrode and normally projecting beyond the face thereof, the spring loaded stop of one housing lying to one side of the electrodes and that of the other housing lying to the other side of the electrodes, whereby to control the amount of overlap of the ends of the strips, means for bringing the two electrodes into engagement with the overlapping ends of the strips and pressing them towards one another, a switch actuated by the said means for controlling the supply of high frequency energy to the electrodes, and means for arresting the inward movement of said electrodes when the jointed overlapping ends attain a predetermined thickness.

2. Apparatus for jointing strips of thermoplastic insulating material by heating the overlapping ends thereof by subjecting them to a high frequency electric field and compressing them to weld them together, comprising a pair of relatively movable jaws, an insulating housing on each jaw, an electrode located in a central recess in each housing and having its face flush with that of the housing, a spring loaded stop located in a recess in each housing and extending along one edge of the electrode and normally projecting beyond the face thereof, the spring loaded stop of one housing lying to one side of the electrodes and that of the other housing lying to the other side of the electrodes, whereby to control the amount of overlap of the ends of the strips, means for bringing the two electrodes into engagement with the overlapping ends of the strips and pressing them towards one another, a switch actuated by the said means for controlling the supply of high frequency energy to the electrodes, means for limiting sideways flow of heated thermoplastic material, said means comprising stops which enter recesses in one of the housings as the housings and their electrodes approach one another, and means for arresting the inward movement of said electrodes when the jointed overlapping ends attain a predetermined thickness.

3. In apparatus for the production of a moulding of thermoplastic insulating material of a predetermined dimension in at least one direction by heating the material by subjecting it to a high frequency electric field and compressing it, comprising a pair of moulding members, each comprising an electrode, means for creating a high frequency electric field between said electrodes and in said material to generate heat in the material and soften it, means for moving the moulding members towards one another to apply pressure to the material and to press it to shape when in a heat-softened state, and means for arresting the inward movement of the moulding members when the moulding attains the predetermined dimension, a pair of switches connected in series and controlling the means for creating a high frequency field, one of said switches being actuated by the pressure applying means and the other being a normally closed thermal delay switch with a controlling heater energised by the closing of the first switch, whereby the delay switch opens a predetermined time after the closing of the first switch.

4. In apparatus for the production of a moulding of thermoplastic insulating material of a predetermined dimension in at least one direction by heating the material by subjecting it to a high frequency electric field and compressing it, comprising a pair of moulding members, each comprising an electrode, means for creating a high frequency field between said electrodes, means for moving the moulding members towards one another to apply pressure to the material and to press it to shape when in a heat-softened state, and means for arresting the inward movement of the moulding members when the moulding attains the predetermined dimension, a switch actuated by the pressing means, and means for adjusting the strength of said field comprising a regulating device and a bimetallic helix operating it, said helix being heated electrically by power controlled by said switch.

5. In apparatus for the production of a moulding of thermoplastic insulating material of a predetermined dimension in at least one direction by heating the material by subjecting it to a high frequency electric field and compressing it, comprising a pair of moulding members, each comprising an electrode, a high frequency generator for supplying the electrodes with high frequency electrical energy, means for moving the moulding members towards one another to apply pressure to the material and to press it to shape when in a heat-softened state, and means for arresting the inward movement of the moulding members when the moulding attains the predetermined dimension, a switch, actuated by the pressing means, for controlling the power supply to the generator and a regulating device for adjusting the voltage of the power supply during the heating operation, said regulating device being actuated by a bimetallic helix heated electrically by power controlled by the switch.

6. In apparatus for the production of a moulding of thermoplastic insulating material of a predetermined dimension in at least one direction by heating the material by subjecting it to a high frequency electric field and compressing it, comprising a pair of moulding members, each comprising an electrode, a high frequency generator for supplying high frequency energy to said electrodes, means for moving the moulding members towards one another to apply pressure to the material and to press it to shape when in a heat-softened state, and means for arresting the inward movement of the moulding members when the moulding attains the predetermined dimension, a switch, actuated by the pressing means, for controlling the power supply to said generator, and a voltage regulating device for adjusting the voltage of the power supply during the heating operation, said device comprising a plurality of series connected impedances in the power supply circuit, a plurality of thermal delay switches, one connected across each of said impedances, the first delay switch of the series having a heater the power supply to which is controlled by the switch actuated by the pressing means, and the remaining delay switches each having a heater the power supply to which is controlled by the preceding delay switch of the series, whereby the delay switches operate at predetermined intervals of time after closing of the switch actuated by the pressing means and thus bring about a step-by-step variation in the total impedance in the supply circuit.

7. In apparatus for the production of a moulding of thermoplastic insulating material of a predetermined dimension in at least one direction by heating it by subjecting it to a high-frequency field and compressing it, comprising a pair of relatively movable moulding members, each comprising an electrode, means for pressing the said moulding members towards one another, and means for arresting the relative inward movement of said moulding members when the distance between them reaches a predetermined minimum value corresponding to the predetermined dimension of the moulding in the direction of movement of the moulding members, a switch actuated by relative inward movement of said moulding members for controlling the supply of high-frequency energy to the electrodes, said switch closing when the distance between the moulding members reaches a predetermined value and opening again not later than when the distance between the said moulding members reaches the predetermined minimum value, and means for adjusting the strength of the high-frequency field comprising a regulating device and a bi-metallic helix operating said device, said helix being heated electrically by power controlled by said switch.

8. In apparatus for the production of a moulding of thermoplastic insulating material of a predetermined dimension in at least one direction by heating it by subjecting it to a high-frequency electric field and compressing it, comprising a pair of moulding members, each comprising an electrode, a high-frequency generator for supplying high-frequency energy to said electrodes, means for moving the moulding members towards one another to apply pressure to the material and to press it to shape when in a heat-softened state, and means for arresting the inward movement of the moulding members when the moulding attains the predetermined dimension, a switch, actuated by movement of the moulding members towards one another for controlling the power supply from said generator, said switch closing when the distance between the said moulding members reaches a predetermined value and opening again not later than when the moulding attains the predetermined dimension in the direction of movement of the moulding members, and a voltage-regulating device for adjusting the voltage of the power supply during the heating operation, said device comprising a plurality of series connected impedances in the power-supply circuit, a plurality of thermal delay switches, one connected across each of said impedances, the first delay switch of the series having a heater the power supply to which is controlled by the switch actuated by the pressing means, and the remaining delay switches each having a heater the power supply to which is controlled by the preceding delay switch of the series, whereby the delay switches operate at predetermined intervals of time after closing of the switch actuated by inward movement of the moulding members and thus bring about a step-by-step variation in the total impedance in the supply circuit.

9. Apparatus for the production of a moulding of a heat mouldable insulating material of a predetermined dimension in at least one direction by heating it by subjecting it to a high frequency electric field and compressing it, comprising a pair of relatively movable moulding members, each comprising an electrode, means for pressing the said moulding members toward one another, means for arresting the relative inward movement of said moulding members when the distance between them reaches a predetermined minimum value corresponding to the predetermined dimension of the moulding in the direction of movement of the moulding members, and a switch, actuated by relative inward movement of said moulding members, for controlling the supply of high frequency energy to the electrodes, said switch closing when the distance between the moulding members reaches a predetermined value and opening again not later than when the distance between the said moulding members reaches the predetermined minimum value and comprising two pairs of contacts connected in series, the contacts of one pair being normally open and those of the other pair normally closed, means for closing the contacts of the first pair and opening those of the second pair, means for delaying the opening of the contacts of the second pair, means for opening the contacts of the first pair during a mutually receding movement of the moulding members, means for closing the contacts of the second pair during said mutually receding movement, and means for delaying the closing of the contacts of the second pair until the contacts of the first pair are open.

10. Apparatus for jointing strips of thermoplastic insulating material by heating the overlapping ends thereof by subjecting them to a high frequency electric field and compressing them to weld them together, comprising a pair of relatively movable jaws, an insulating housing on each jaw, an electrode in each housing, a spring loaded stop located in a recess in each housing and extending along one edge of the housed electrode and normally projecting beyond the face of the housing, the spring loaded stop of one housing lying to one side of the housed electrode and that of the other housing lying to the other side of the housed electrodes, whereby to control the amount of overlap of the ends of the strips, means for moving the jaws towards one another whereby to press the overlapping ends of the strips together, a switch actuated by the said means for controlling a supply of high frequency energy to the housed electrodes, and means for arresting the inward movement of said jaws when the jointed overlapping ends attain a predetermined thickness.

11. In apparatus for the production of a moulding of thermoplastic insulating material of a predetermined dimension in at least one direction, comprising a pair of moulding members, each comprising an electrode, means for creating a high-frequency field of electric force between said electrodes and in the material for generating heat therein whereby to soften it, means for moving said members towards one another to apply pressure to the material and to press the heat-softened material to shape, and means for arresting the inward movement of said members when the moulding of heat-softened material attains the predetermined dimension, means actuated by initial relative inward movement of said moulding members for applying a high frequency field to the material and means actuated by said last-named means upon further inward movement of the moulding members for removing the field prior to the removal of said pressure.

12. Apparatus for jointing strips of thermoplastic insulating material by heating the overlapping ends thereof by subjecting them to a high frequency electric field and compressing them to weld them together, comprising a pair of relatively movable jaws, an insulating housing on each jaw, a high-frequency electrode in a recess in the face of each housing, means for bringing the two electrodes into engagement with the overlapping ends of the strips to be joined and pressing them towards one another, and a switch, actuated by the said means for controlling the supply of high-frequency energy to the electrodes by closing following an inward movement of said jaws when said electrodes are a predetermined distance apart and opening automatically by a subsequent inward movement of the electrodes of a predetermined extent, and means for arresting the inward movement of said electrodes when the jointed overlapping ends of the strips attain a predetermined thickness.

13. In apparatus for the production of a moulding of thermoplastic insulating material of a predetermined dimension in at least one direction by heating it by subjecting it to a high-frequency electric field and compressing it, comprising a pair of relatively movable moulding members, each comprising an electrode, means for pressing the said moulding members towards one another, and means for arresting the relative inward movement of said moulding members when the distance between them reaches a predetermined minimum value corresponding to the predetermined dimension of the moulding in the direction of movement of the moulding members, a switch for controlling the supply of high-frequency energy to the electrodes, means capable of adjustment and operated by said pressing means for closing said switch when the distance between the moulding members is reduced to a predetermined value, and means for opening said switch again when the distance between said moulding members is reduced to a predetermined value less than the last said value.

14. Apparatus for jointing strips of thermoplastic material by heating the overlapping ends thereof by subjecting them to a high-frequency electric field and compressing them to weld them together, comprising a pair of relatively movable jaws, each comprising an insulating housing and an electrode therein, means for bringing the two jaws into engagement with the overlapping ends of the strips to be joined and pressing them towards one another, means projecting from said housings for limiting the amount of overlap of the ends of said strips, and a switch, actuated by the first said means, for controlling the supply of high-frequency energy to the electrodes by closing, following an initial inward movement of said jaws, when said electrodes are a predetermined distance apart, and opening automatically, following a subsequent inward movement of said jaws to a predetermined extent, and means for arresting inward movement of said jaws when the jointed overlapping ends of the strips attain a predetermined thickness.

15. In apparatus for the production of a moulding of thermoplastic insulating material of a predetermined dimension in at least one direction, comprising a pair of moulding members, each comprising an electrode, means for creating a high frequency field of electric force between said electrodes and in the said material for generating heat in said material whereby to soften it, means for moving at least one of said members towards the other to apply pressure to the material and to press the heat-softened material to shape, and means for arresting the relative inward movement of said members when the moulding of heat-softened material attains the predetermined dimension, a device for controlling the supply of high-frequency energy to said electrodes, said device comprising a switch actuated by relative movement of said moulding members, adjustment means for setting said switch to close, following an initial relative inward movement of said members, when pressure is exerted by said members on said material, and a switch, in series with first said switch, set to open, following further relative inward movement of said members to a predetermined extent.

16. In apparatus for the production of a moulding of thermoplastic insulating material of a predetermined dimension in at least one direction, comprising a pair of moulding members, each comprising an electrode, means for creating a high-frequency field of electric force between said electrodes and in the said material for generating heat in said material whereby to soften it, means for moving at least one of said members towards the other to apply pressure to the material and to press the heat-softened material to shape, and means for arresting the relative inward movement of said members when the moulding of heat-softened material attains the predetermined dimension, a device for controlling the supply of high-frequency energy to said electrode, said device comprising a switch having a pair of switch contacts opening and closing by relative movement of said moulding members, adjustment means for setting said switch whereby said contacts close following an initial inward movement of said members, when pressure is exerted by said members on said material, and a second pair of switch contacts in series with the first said pair of contacts and means for opening said second pair of contacts at the end of further relative inward movement of said members to a predetermined extent.

17. In apparatus for the production of a moulding of thermoplastic insulating material of a predetermined dimension in at least one direction, comprising a pair of moulding members, each comprising an electrode, means for creating a high frequency field of electric force between said electrodes and in the said material for generating heat in said material whereby to soften it, means for moving at least one of said members towards the other to apply pressure to the material and to press the heat-softened material to shape, and means for arresting the relative inward movement of said members when the moulding of heat-softened material attains the predetermined dimension, a device for controlling the supply of high frequency energy to said electrode, said device comprising a switch actuated by relative movement of said moulding members, adjusting means for setting said switch to close, following an initial relative inward movement of said members, when pressure is exerted by said members on said material and in series with first said switch, a normally closed thermal delay switch, with a controlling heater energized by the closing of the first said switch and set to open at the end of a further relative inward movement of said members to a predetermined extent.

GEORGE HALL WALTON.
JOSHUA CREER QUAYLE.
PETER JONES.